United States Patent [19]
Dillinger

[11] Patent Number: 4,578,901
[45] Date of Patent: Apr. 1, 1986

[54] AUTOMOTIVE LOUVERED SHADE
[75] Inventor: Gerald A. Dillinger, Okemos, Mich.
[73] Assignee: Hammond Manufacturing Corporation, Lansing, Mich.
[21] Appl. No.: 570,919
[22] Filed: Jan. 16, 1984
[51] Int. Cl.⁴ .............................................. E05B 65/04
[52] U.S. Cl. ........................................ 49/62; 52/473; 296/97 A
[58] Field of Search ............... 49/62, 67; 52/473, 581; 296/95 R, 97 A; 206/577, 335, 321, 326

[56]         References Cited
        U.S. PATENT DOCUMENTS

| D. 245,689 | 9/1977 | Simpson . | |
|---|---|---|---|
| D. 250,527 | 12/1978 | Sacco . | |
| 3,120,883 | 2/1964 | Greiling | 52/473 |
| 4,006,933 | 2/1977 | Simpson . | |
| 4,023,309 | 5/1977 | Backward . | |
| 4,081,937 | 4/1978 | Koch . | |
| 4,121,380 | 10/1978 | Lockshin . | |
| 4,204,368 | 5/1979 | Lockshin . | |
| 4,232,483 | 11/1980 | Lockshin . | |
| 4,318,338 | 3/1982 | Felter | 52/473 X |
| 4,368,605 | 1/1983 | Ulrich . | |
| 4,453,762 | 6/1984 | Deaver | 52/473 X |

Primary Examiner—Kenneth Downey
Attorney, Agent, or Firm—Ian C. McLeod

[57]            ABSTRACT

A rear window louvered shade for an automobile having a long downwardly sloping rear window which can be disassembled into parts for shipment is described. The construction provides an assembled shade which hides from view the points where the parts are joined together.

4 Claims, 7 Drawing Figures

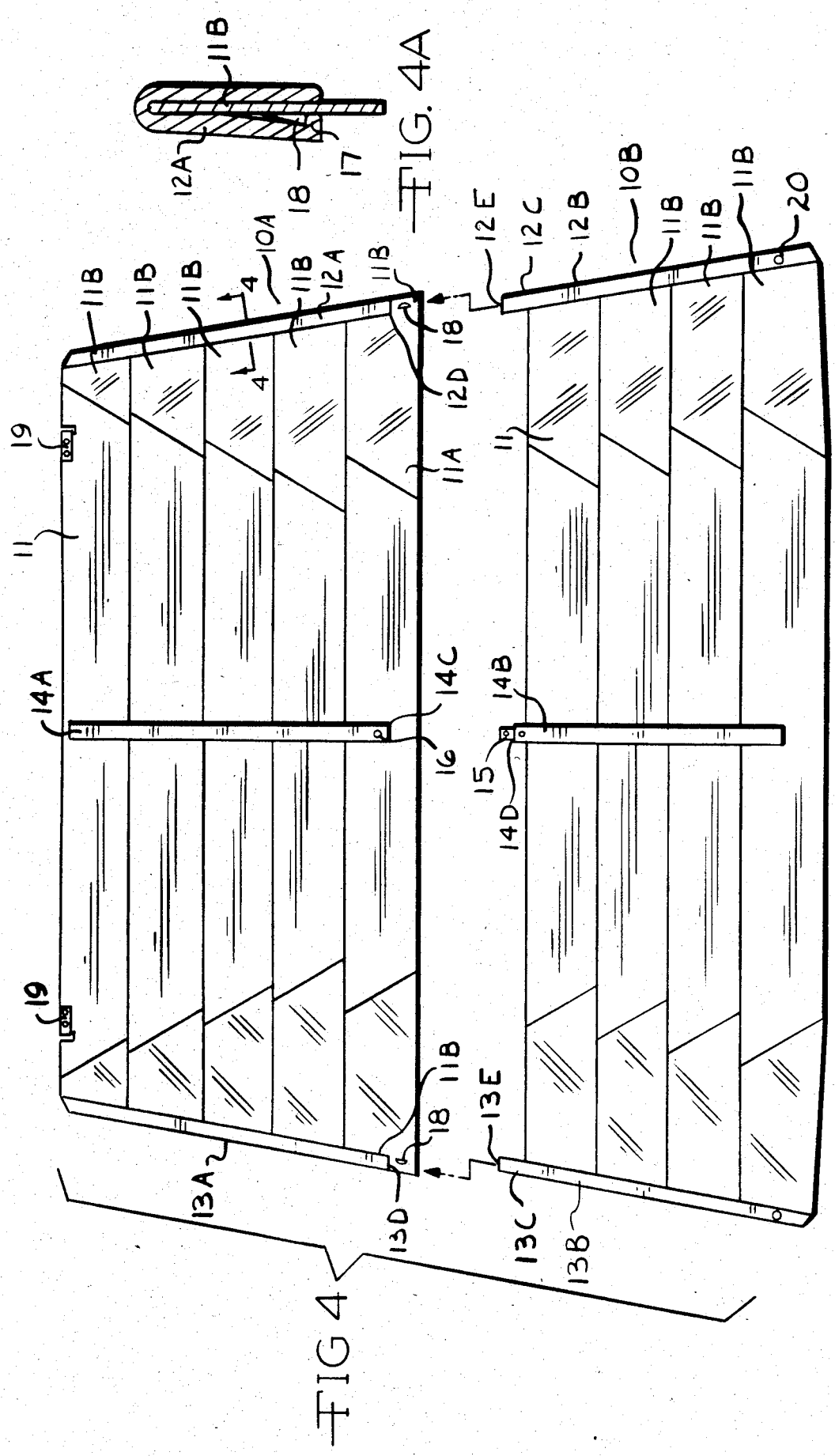

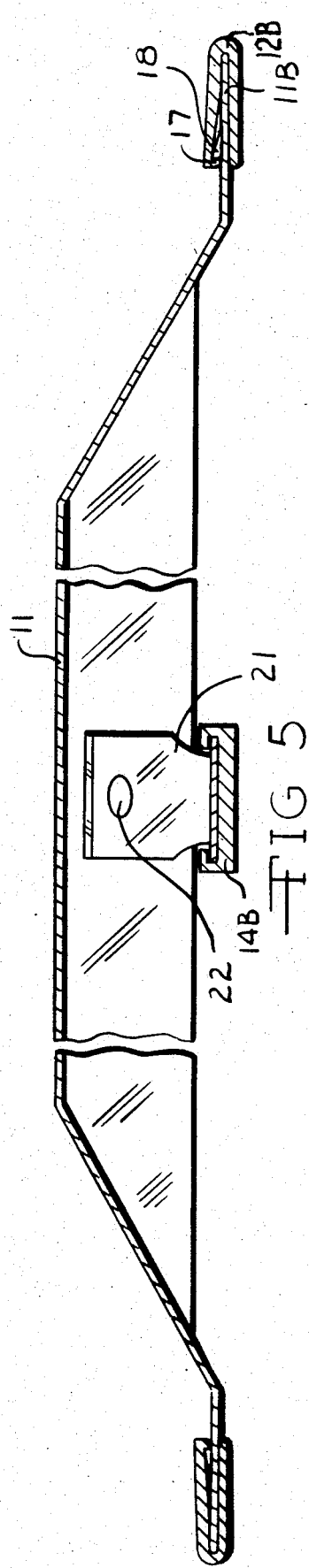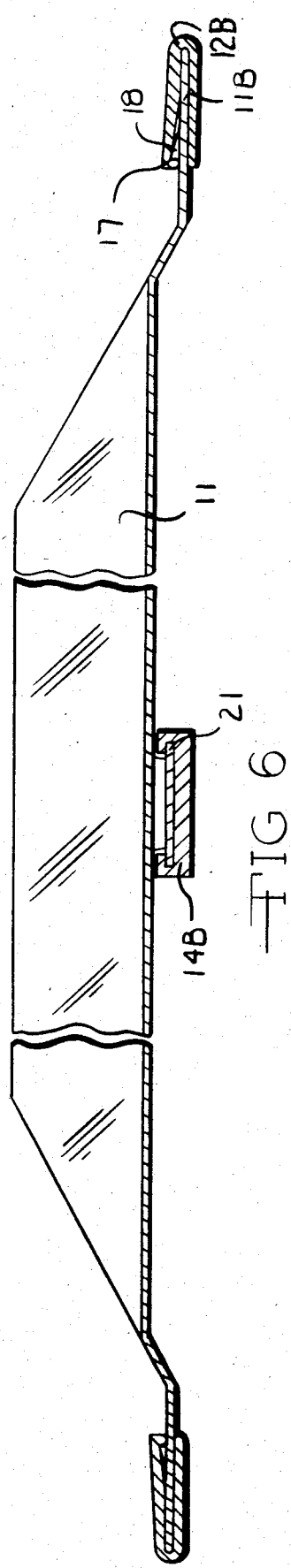

4,578,901

AUTOMOTIVE LOUVERED SHADE

BACKGROUND OF THE INVENTION (1) Field of the Invention

The present invention relates to a rear window shade for an automobile with a long downwardly sloping rear window. In particular, the present invention relates to a shade which can be disassembled for shipment.

(2) Prior Art

The advent of long sloping rear windows on automobiles has produced a need for rear window sun louvered shades. Such shades are described in U.S. Pat. Nos. 4,006,933 to Simpson, U.S. Pat. No. 4,023,309 to Backward, U.S. Pat. No. 4,081,937 to Koch, U.S. Pat. No. 4,368,605 to Ulrich and U.S. Pat. Nos. Des. 245,689 to Simpson and Des. 250,527 to Sacco.

The problem has been that the louvered shades have become so long because of the lengthening of automotive rear windows that they can not be sent by United Parcel Service (UPS), which requires total combined dimensions (length and girth) of 110 inches. The result has been that the shades must be sent by motor freight which is very expensive. It would be very advantageous to be able to disassemble the shade in order to send the shade by UPS; however, providing means for joining parts of the shade together can ruin the design of the louver.

OBJECTS

It is therefore an object of the present invention to provide a shade which can be disassembled for shipment and yet retains smooth lines when assembled. It is further an object of the present invention to provide a shade which can be disassembled for shipment and yet is simple and inexpensive to construct. These and other objects will become increasingly apparent by reference to the following description and to the drawings.

IN THE DRAWINGS

FIG. 4 is a bottom plan view of the disassembled shade of FIG. 1. FIG. 4A is a partial cross-section along line 4—4 of FIG. 4 showing integral teeth (18) on louver ends (11B).

FIG. 5 is a front cross-sectional view along 5—5 of FIG. 1 showing teeth (18) engaging ridges (17) in a U shaped channel (12) holding the ends (11B) of the louvers (11) together and showing a louver attaching bracket (21) with a hole (22) for attachment from a rib channel (14A or 14B).

FIG. 6 is a front cross-sectional view along line 6—6 of FIG. 1 showing a section of the louver attaching bracket (21).

GENERAL DESCRIPTION

Figure 1:
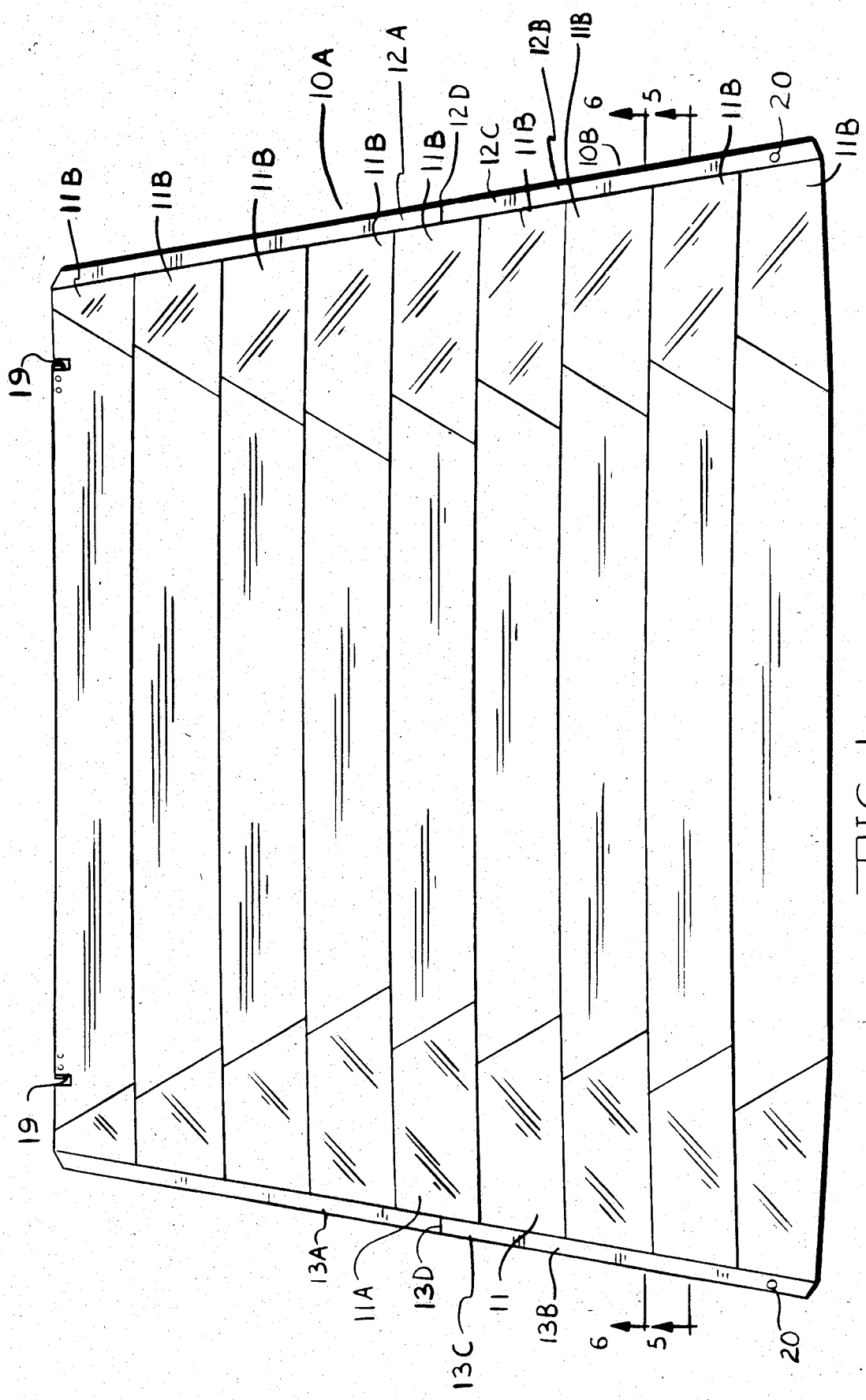
FIG. 1 is a top plan view of the shade of the present invention formed by adjoining parallel louvers (11), particularly illustrating the assembled sections of the shade.

The present invention relates to a rear window shade (10) for an automobile having a long downwardly sloping rear window including a plurality of horizontally oriented parallel louvers (11) providing shade for the rear window and rearward visibility between opposite ends (11B) of the louvers from inside the automobile, wherein the louvers are joined to each other at the ends to form a unit by a strip (12, 13) extending along the downwardly sloping rear window, wherein the louvers are further joined to each other by a central rib (14) which is between the strips and adjacent the window and including attachment means (19, 20) for mounting the louvers on the rear window, the improvement which comprises:

(a) a shade which can be disassembled into two parts (10A and 10B) by separating one first group of louvers from a second group of louvers wherein each part includes:

(1) U shaped channels (12, 13) as the strips which fit over the ends of the louvers, wherein the U shaped channels are divided into two sections (12A and 12B, 13A and 13B) so that on one part of the shade adjacent to where the parts are to be joined together the channel has an extension away from the louver and on the other part of the shade the channel is shortened at an adjacent louver end so that the extension and adjacent louver end engage in a tongue and groove manner so that the separation of the strip is hidden when the two parts are assembled by abutment of channel ends (12C and 12D, 13C and 13D); and (2) a central rib (14) divided into two sections (14A, 14B) between the parts (10A and 10B) are joined together by abutment of adjacent rib ends (14C and 14D) upon assembly; and (b) locking means (15) at the adjacent rib ends for holding the assembled parts of the shade together.

SPECIFIC DESCRIPTION

Figure 2:
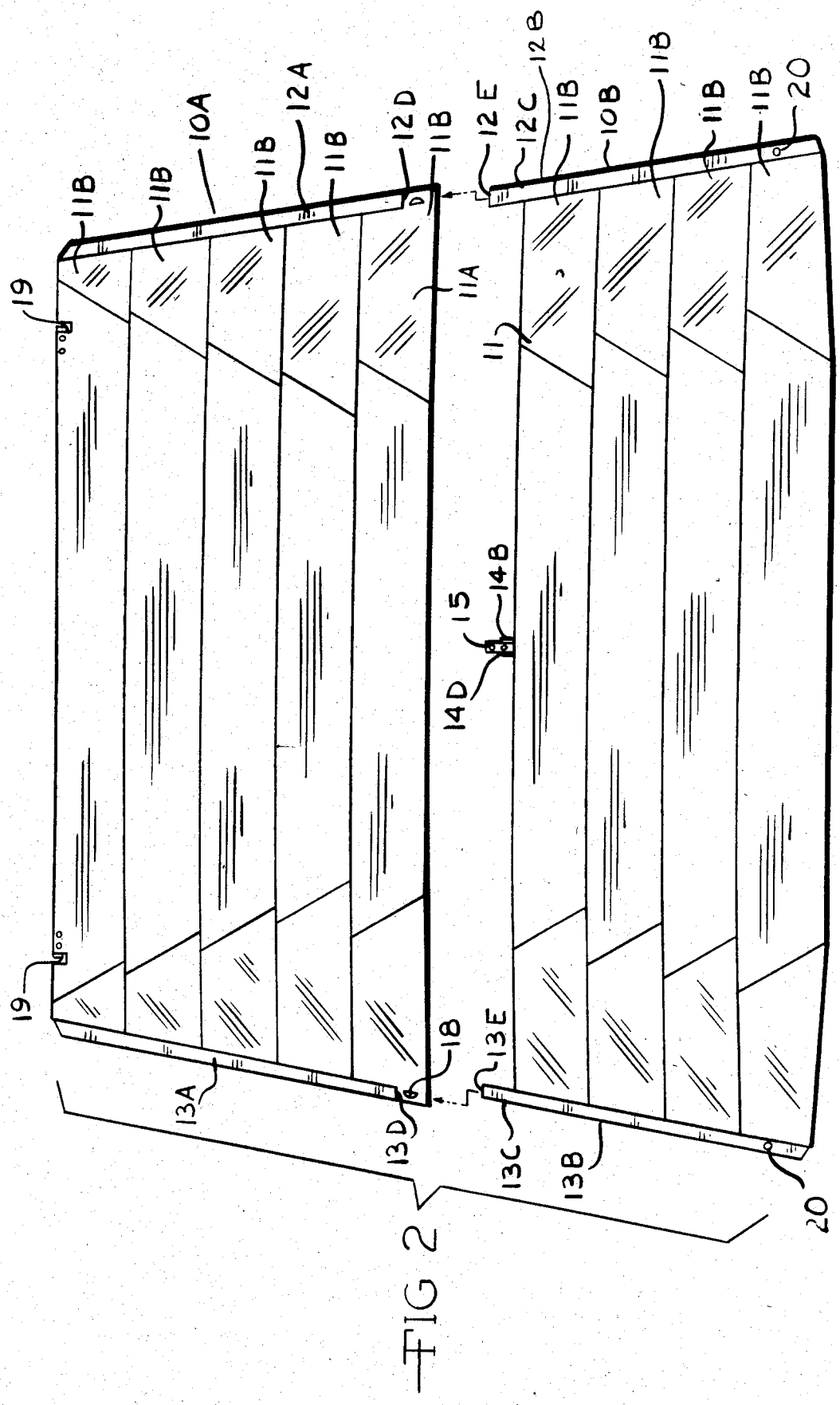
FIG. 2 is a top plan view of the disassembled shade as shown in FIG. 1.
Figure 3:
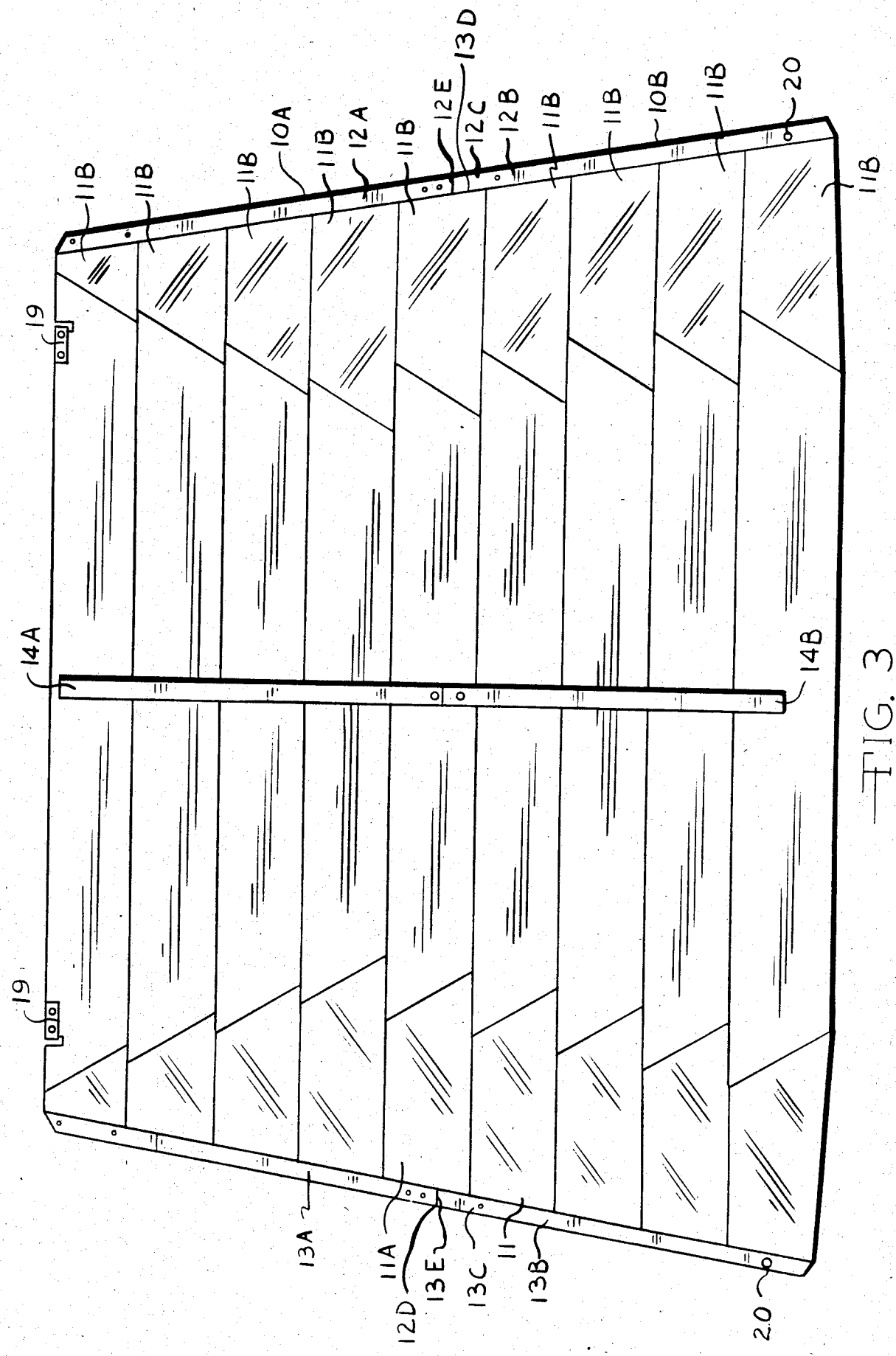
FIG. 3 is a bottom plan view of the assembled shade of FIG. 1.

Referring to FIGS. 1 to 6 the shade 10 of the present invention is shown including parts 10A and 10B which are separated for shipment so that the combined length and width meets UPS requirements. The shade 10 includes parallel louvers 11 which are adjoining each other and which are shaped to provide shade for the rear window of the car and yet allow rearward viewing by occupants of the automobile as is well known to those skilled in the art. One part 10A of the shade 10 has a louver 11A adjacent to where the parts 10A and 10B are to be joined together which has ends 11B which are exposed. The ends 11B of the louvers 11 are otherwise joined together by U shaped channels 12 and 13 which are mounted on the ends 11b. The channels 12 and 13 are divided into sections 12A and 12B and 13A and 13B at ends 12D and 12E and at ends 13D and 13E and the sections 12B and 13B (or 12A and 13A) have extensions 12C and 13C which engage the ends 11B of the adjacent louver 11A in a tongue and groove manner. The louvers 11 are joined together by means of a central channel rib 14 which separates into two sections 14A and 14B at opposing ends 14C and 14D. A flat projection 15 attached to one rib section 14B slides into into the other rib section 14A and is secured in place by means of a screw 16 through the rib and into projection 15. As can be seen, the separation of the shade parts 10A and 10B is completely controlled by the single screw 16 in the central rib 14A and as a result there are no unsightly holding means on the U-shaped channel sections 12A, 12B, 13A and 13B.

The channels 12 and 13 are provided with a ridge 17 along the length which engages teeth 18 upset into the louvers 11. During construction the channel sections 12A, 12B, 13A and 13B are snapped into place over the teeth 18. This is the preferred construction although other fastening means for securing the channels 12 and 13 to the louvers 11 can be used such as rivets (not shown) which are not preferred because of the potential distortion of the clean lines of the shade design.

The shade 10 includes hinge means 19 and an opening 20 for a conventional locking means (not shown) both of which are well known to those skilled in the art. The shade 10 is generally secured to the rear window by means of side panels or mounting means such as shown in U.S. Pat. Nos. 4,131,380, 4,204,368, and 4,232,483 to Lockshin (not shown) which are attached to the automobile along the sides of the rear window to provide an attachment means for the hinge means 19 and the locking means 20. All of this is well known to those skilled in the art.

Parts 10A and 10B of the shade 10 can be positioned against each other with the ribs 14A and 14B and side channels 12A, 12B and 13A and 13B on top of each other. They can be secured together by tieing, taping or the like and then boxed for shipment. The parts 10A and 10B can then easily be assembled together by inserting extensions 12C and 13C onto the exposed portions 11B of the louver 11 such that the ends 12D, 12E and 13D, 13E of channels 12 and 13 are butt joined together to be only barely visible. The projection 15 into channel 14A is secured by screw 16.

As will be apparent, there are numerous variations in louver 11 shape. Also it will be appreciated that the shade 10 may have a curve along the long downward shape of the window to accommodate a corresponding window configuration. Further, it will be appreciated that the locking clips 25 of U.S. Pat. No. 4,368,605 to Ulrich can be used in place of teeth 18. All of these variations are included within the scope of the present invention.

I claim:

1. In a rear window shade for an automobile having a long downwardly sloping rear window including a plurality of horizontally oriented parallel louvers providing shade for the rear window and rearward visibility between opposite ends of the louvers from inside the automobile, wherein the louvers are joined to each other at the ends to form a unit by a strip extending along the downwardly sloping rear window, wherein the louvers are further joined to each other by a central rib which is between the strips and adjacent the window and including attachment means for mounting the louvers in the rear window, the improvement which comprises:

(a) a shade which can be disassembled into two parts by separating one first group of louvers from a second group of louvers wherein each part includes:
      (1) U shaped channels as the strips which fit over the ends of the louvers, wherein the U shaped channels are divided into two sections so that on one part of the shade adjacent to where the parts are to be joined together, the channel has an extension away from the louver and on the other part of the shade the channel is shortened at an adjacent louver end so that the extension and adjacent louver end engage in a tongue and groove manner so that the separation of the channel is hidden when the two parts are assembled by abutment of channel ends; and
      (2) a central rib divided into two sections between the parts and joined together by abutment of adjacent rib ends upon assembly; and
   (b) locking means at the adjacent rib ends for holding the assembled parts of the shade together.

2. The shade of claim 1 wherein the rib is in the form of a channel and wherein the locking means is a flat projection extending between the adjoining rib ends when the parts of the shade are assembled and a set screw threaded through the channel into projection to hold the parts of the shade together.

3. The shade of claim 1 wherein the louvers have teeth from one side adjacent the lower ends which engage a corresponding ridge in the inside of the U shaped channel to hold the louvers and strips together; and wherein the teeth engage the extension of the channel between the parts of the shade when joined together.

4. The shade of claim 3 wherein the teeth are upset into the ends of the louvers which engage the ridge in the U shaped channel.

* * * * *